(12) United States Patent
Yonaha

(10) Patent No.: US 7,486,808 B2
(45) Date of Patent: Feb. 3, 2009

(54) IMAGE PROCESSING DEVICE, IMAGE PROCESSING METHOD AND IMAGE PROCESSING PROGRAM

(75) Inventor: Makoto Yonaha, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 679 days.

(21) Appl. No.: 11/230,669

(22) Filed: Sep. 21, 2005

(65) Prior Publication Data
US 2006/0062435 A1    Mar. 23, 2006

(30) Foreign Application Priority Data
Sep. 21, 2004   (JP)   ............... 2004-273928

(51) Int. Cl.
*G06K 9/00* (2006.01)
(52) U.S. Cl. ................... 382/118; 382/284
(58) Field of Classification Search ................ 382/118, 382/190, 209, 284; 348/E5.058
See application file for complete search history.

(56) References Cited

U.S. PATENT DOCUMENTS

| | | | |
|---|---|---|---|
| 5,742,879 A | * | 4/1998 | Altrieth, III ................ 399/139 |
| 6,034,785 A | * | 3/2000 | Itoh ........................ 358/1.18 |
| 6,507,671 B1 | * | 1/2003 | Kagan et al. ................ 382/173 |
| 6,539,420 B1 | * | 3/2003 | Fields et al. ................ 709/206 |
| 2004/0028290 A1 | * | 2/2004 | Gamble ...................... 382/284 |

FOREIGN PATENT DOCUMENTS

JP    10-222649 A    8/1998

* cited by examiner

*Primary Examiner*—Daniel G Mariam
(74) *Attorney, Agent, or Firm*—Sughrue Mion, PLLC

(57) ABSTRACT

The image processing device comprises: a photo image input unit which inputs a photographed image including a character; an extraction unit which extracts a facial image which is an image of a facial portion in the photographed image; a template image input unit which inputs a template image having a synthetic area, the synthetic area being a blank area on which the facial image is disposed; a template information input unit which inputs template information prescribing a position for disposing a prescribed component of the facial image on the synthetic area; a decision unit which decides facial configuration information according to an area including the extracted facial image, the facial configuration information being information related to a prescribed component of the facial image; and a synthesizing unit which synthesizes the facial image with the template image by disposing the facial image onto the synthetic area according to the facial configuration information and the template information.

16 Claims, 16 Drawing Sheets

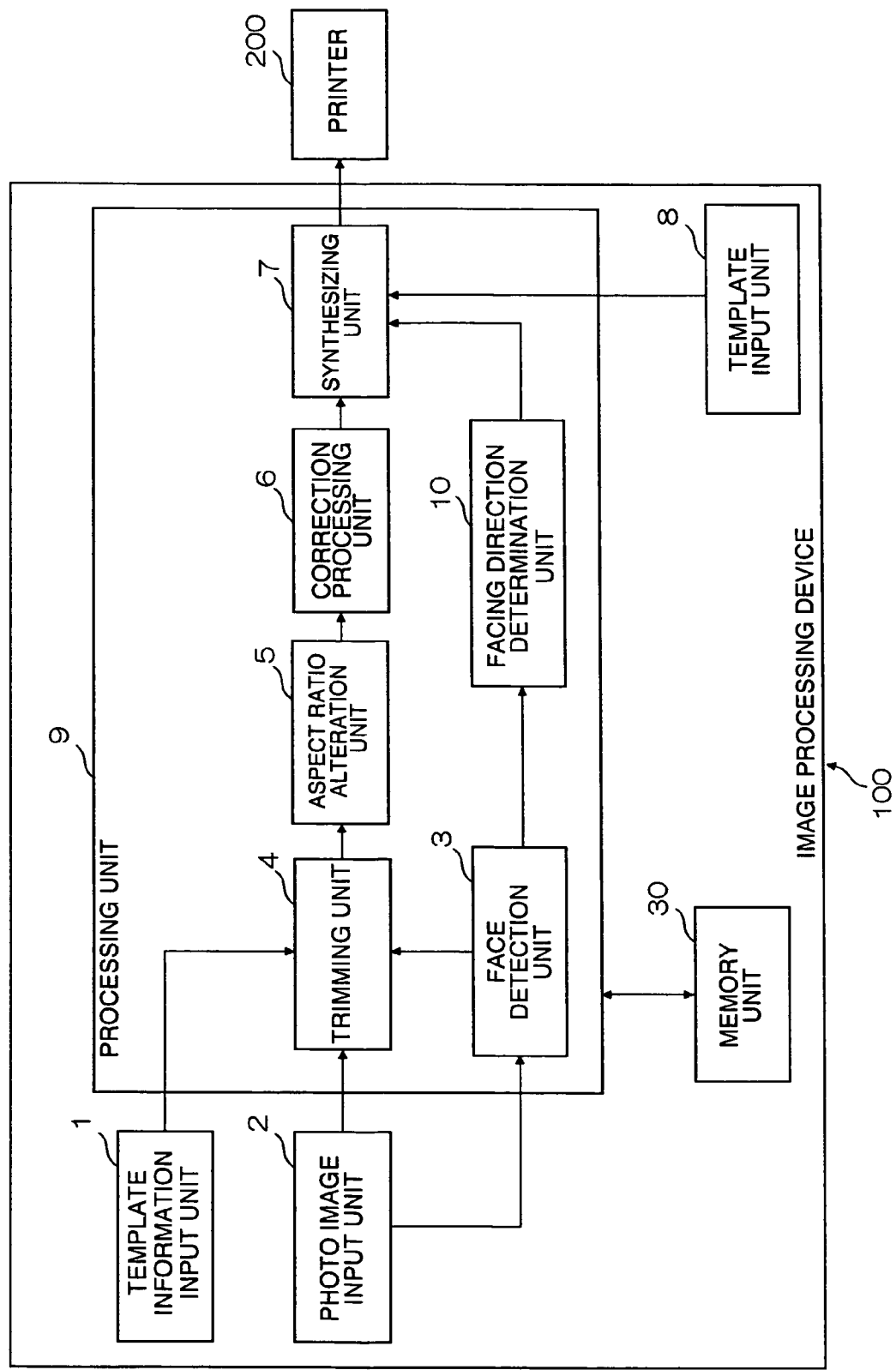

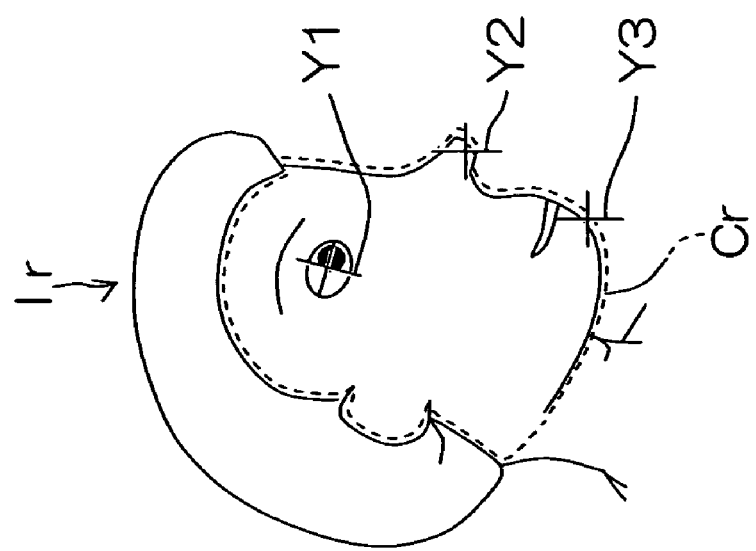
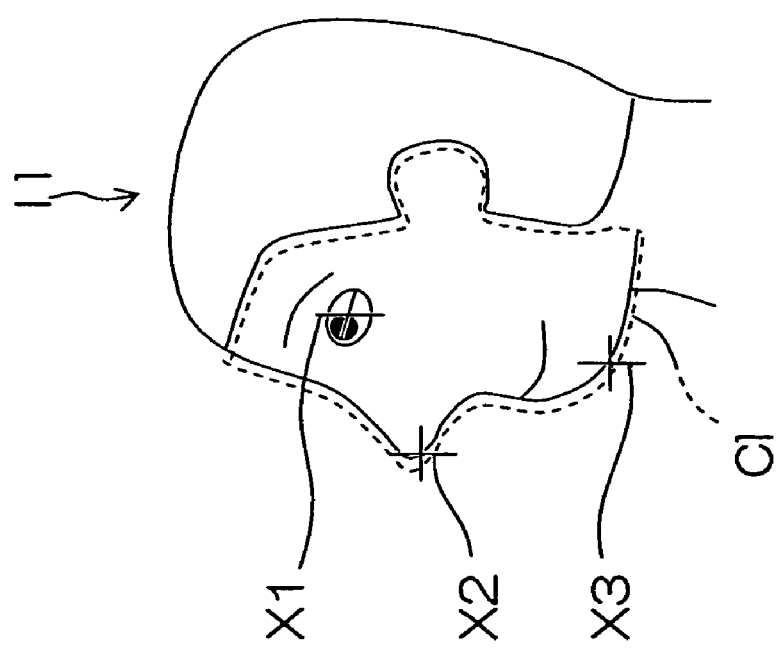

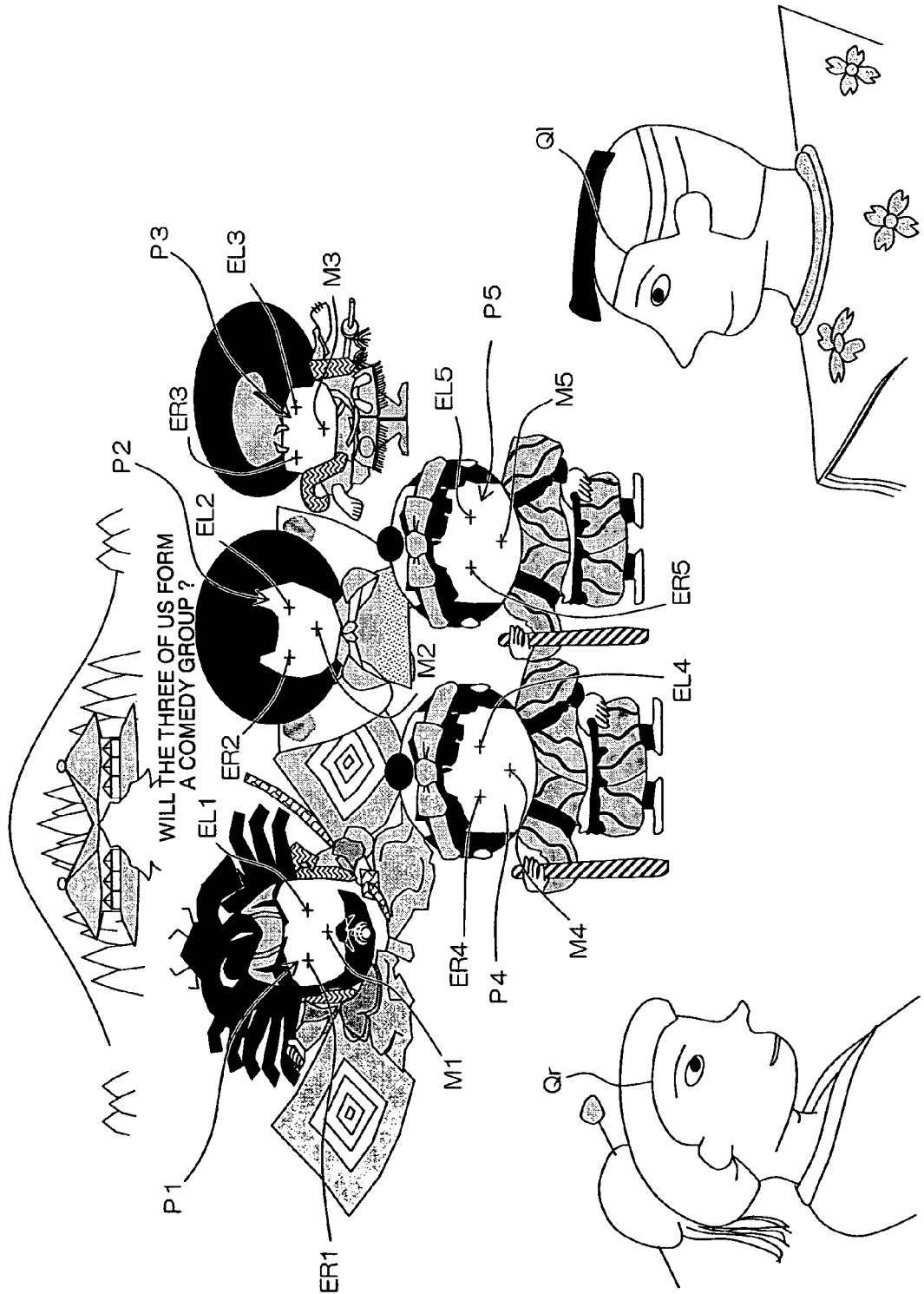

IMAGE PROCESSING DEVICE, IMAGE PROCESSING METHOD AND IMAGE PROCESSING PROGRAM

BACKGROUND OF THE INVENTION

1. Field of the Invention

The present invention relates to an image processing device, an image processing method, and an image processing program, more particularly to an image processing device, an image processing method, and an image processing program which extract a facial portion of an image in which a character is photographed, so that the facial portion is synthesized on a prescribed position of a template.

2. Description of the Related Art

Conventionally, various techniques are developed in order to easily synthesize a facial image, which is an image of a facial portion of a character image, into a background image or a costume image. For example, in Japanese Patent Application Publication No. 10-222649, first, while designating two points as reference for synthesis in a background image or a costume image, two points as reference for synthesizing a facial image are designated so that a hair area in the facial image and an inside area of profile of the facial image are used for synthesis. Next, the two points as the reference for synthesizing the facial image are designated so that a midpoint of line segment connecting the two points is disposed onto a jaw tip while length of the line segment is a breadth of the face, on the horizontal line passing through the jaw tip. Then, a portrait image is generated by mapping the areas used in synthesizing the facial image so that the two points designated on the facial image the two points designated on the background image or the like, overlap one another.

However, in the foregoing Japanese Patent Application Publication No. 10-222649, in the case in which a so-called "backdrop" type template image is adopted as the background image or costume to insert a facial image of a separately photographed character into the blank portion formed by carving out the facial portion of a human character, it is highly likely that the eyes or mouth of the facial image may stick out from the blank portion with the mapping in which the two points designated with respect to the jaw tip are used as the synthetic reference, as described above.

SUMMARY OF THE INVENTION

The present invention is contrived in view of such circumstances, and an object thereof is to provide an image processing device, an image processing method, and an image processing program that can synthesize a facial image onto a blank portion in a "backdrop" type template image appropriately.

In order to achieve the aforementioned objects, the present invention is directed to an image processing device comprising: a photo image input unit which inputs a photographed image including a character; an extraction unit which extracts a facial image which is an image of a facial portion in the photographed image; a template image input unit which inputs a template image having a synthetic area, the synthetic area being a blank area on which the facial image is disposed; a template information input unit which inputs template information prescribing a position for disposing a prescribed component of the facial image on the synthetic area; a decision unit which decides facial configuration information according to an area including the extracted facial image, the facial configuration information being information related to a prescribed component of the facial image; and a synthesizing unit which synthesizes the facial image with the template image by disposing the facial image onto the synthetic area according to the facial configuration information and the template information.

According to the present invention, template information prescribes a position for disposing a prescribed component of a facial image onto a synthetic area which is a blank portion of the template image, and the facial image is synthesized with the template image by being disposed onto the synthesizing position according to facial configuration information and template information. Therefore, it is possible to prevent the facial image from sticking out the synthetic area when synthesizing the facial image to the synthetic area which is the blank portion of the "backdrop" type template image.

The present invention is also directed to the image processing device wherein the decision unit detects the facial portion in the photographed image; the decision unit decides an approximate center position in the facial portion according to the detected facial portion; the decision unit estimates relative position information of the prescribed component of the facial image with respect to the approximate center position; and the decision unit decides the estimated relative position information as the facial configuration information.

In order to prevent the eyes from sticking out from the synthesizing position, it is preferable the prescribed component of the facial image includes at least a right eye and a left eye.

It is preferable that the prescribed component of the facial image further includes at least one of a nose and a mouth.

Therefore, the facial image can be disposed on the synthetic area more accurately.

The present invention is also directed to the image processing device wherein: the decision unit detects position information of at least a left eye and a right eye from the facial image; the decision unit decides the position information as the facial configuration information, the position information being information of the right eye and the left eye which are detected by the decision unit; and the template information includes information which prescribes a position for disposing each of the right eye and the left eye.

Preferably, the template information includes aspect ratio alteration information for prescribing an aspect ratio of the facial image in the synthetic area; and the image processing device further comprises an aspect ratio alteration unit which alters the aspect ratio of the extracted facial image according to the aspect ratio alteration information.

Accordingly, the aspect ratio of the facial image can be altered to coincide with the various shapes (round face shape, and the like) of the synthetic area.

The present invention is also directed to the image processing device wherein: the template information includes correction reference information which becomes a reference for correcting the facial image extracted by the extraction unit; the image processing device further comprises a correction unit which corrects the extracted facial image according to the correction reference information.

It is preferable the correction reference information includes a feature quantity of the template image to be disposed on the periphery of the synthetic area.

According to the present invention, since various corrections of brightness or color according to the feature quantity of the peripheral image can be performed to the facial image, then it is possible to reduce an odd feeling due to the difference in appearance of the synthesized facial image and the template image.

The present invention is also directed to the image processing device wherein: the facial image includes at least one of a front facial image and a lateral facial image, the front facial image being an image of the facial portion which faces frontward, the lateral facial image being an image of the facial portion which faces sideways; the template image includes at least one of a front face synthetic area and a lateral face synthetic area, the front face synthetic area being a synthetic area for disposing the front facial image, the lateral face synthetic area being a synthetic area for disposing the lateral facial image; the template information prescribes at least one of a position for disposing the prescribed component of the front facial image on the front face synthetic area and a position for disposing the prescribed component of the lateral facial image on the lateral face synthetic area; the image processing device further comprises a facing direction determination unit which determines whether the extracted facial image of the extraction unit is the front facial image or the lateral facial image; and the synthesizing unit synthesizes the facial image with the template image by respectively disposing at least one of the front facial image and the lateral facial image onto at least one of the front face synthetic area and the lateral face synthetic area according to the template information and a determination result by the facing direction determination unit.

According to the present invention, since the facial image can be synthesized with an appropriate synthesizing position according to the facial orientation, then it is possible to prevent the generation of an odd feeling due to the mismatch of the facial orientation and the template image.

The present invention is also directed to the image processing device wherein: the facing direction determination unit determines whether the lateral facial image is a right facial image or a left facial image, the right facial image being an image of the facial portion facing rightward, the left facial image being an image of the facial portion facing leftward, the template image includes at least one of a right face synthetic area and a left face synthetic area, the right face synthetic area being a synthetic area for disposing the right facial image, the left face synthetic area being a synthetic area for disposing the left facial image; the template information prescribes at least one of a position for disposing the prescribed component of the right facial image on the right face synthetic area and a position for disposing the prescribed component of the left facial image on the left face synthetic area; and the synthesizing unit synthesizes the facial image with the template image by respectively disposing at least one of the right facial image and the left facial image onto at least one of the right face synthetic area and the left face synthetic area according to the template information and a determination result by the facing direction determination unit.

According to the present invention, a lateral facial image can be disposed onto an appropriate synthesizing position according to whether the face is facing rightward or leftward.

The present invention is also directed to the image processing device wherein: the decision unit detects the position information of a jaw tip and at least one of the right eye and the left eye according to the lateral facial image; the decision unit decides the detected position information of at least one of the right eye and the left eye and the detected position information of the jaw tip as the facial configuration information; and the template information prescribes a position for respectively disposing at least one of the right eye and the left eye and the jaw tip of the lateral facial image on the lateral face synthetic area.

According to the present invention, the position for relatively disposing the right eye or left eye and the jaw tip of the lateral facial image onto the lateral face synthetic areas is previously prescribed in the template information. If position information of the right eye or left eye and position information of the jaw tip is detected, the right eye or left eye and the jaw tip are disposed onto the position prescribed with the template information. Therefore, the lateral face image can be appropriately disposed onto the lateral face synthetic area according to the positions of the right eye or left eye and the jaw tip.

The present invention is also directed to the image processing device further comprising a blurring processing unit which performs blurring process to a peripheral edge portion of the blank area of the synthetic area after synthesizing the facial image with the template image by the synthesizing unit.

According to the present invention, since a blurring process is performed to the peripheral edge of blank in the template image, then it is possible to alleviate an odd feeling due to the unnatural boundary existing between the facial image and the template image.

In order to attain the aforementioned object, the present invention is directed to an image processing method comprising the steps of: inputting a photographed image including a character; extracting a facial image which is an image of a facial portion of the photographed image; inputting a template image having a synthetic area which is a blank area for disposing the facial image; inputting template information which prescribes a position for disposing a prescribed component of the facial image on the synthetic area; deciding facial configuration information from an area including the facial image extracted in the extraction step, the facial configuration information being information relating to a prescribed component of the facial image; and synthesizing the facial image with the template image by disposing the facial image onto the synthetic area according to the facial configuration information and the template information.

In order to attain the aforementioned object, the present invention is directed to a computer readable medium having embodied thereon a computer program for processing by a computer, the computer program comprising: a first code segment for inputting a photographed image including a character; a second code segment for extracting a facial image which is an image of a facial portion of the photographed image; a third code segment for inputting a template image having a synthetic area which is a blank area for disposing the facial image; a fourth code segment for inputting template information which prescribes a position for disposing a prescribed component of the facial image onto the synthetic area; a fifth code segment for deciding facial configuration information from an area including the extracted facial image, the facial configuration information being information relating to a prescribed component of the facial image; and a sixth code segment for synthesizing the facial image with the template image by disposing the facial image onto the synthetic area according to the facial configuration information and the template information.

The present invention is also directed to the medium wherein the medium is a propagated signal.

The present invention is also directed to the medium wherein the propagated signal is a carrier wave.

According to the present invention, the image processing program yields the same operation and effect as the image processing device described above. The image processing program may be provided by being recorded on a CD-ROM, DVD, MO, or other computer readable recording mediums.

As described above, according to the present invention, the template information prescribes a position for disposing a prescribed component of a facial image onto a synthetic area which is a blank portion of the template image, and then the facial image is synthesized with the template image disposed onto the synthesizing position according to the facial configuration information and the template information. Therefore, it is possible to prevent the facial image from sticking out the synthetic area when synthesizing the facial image into the synthetic area which is the blank portion of the "backdrop" type template image.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 12 is a schematic block diagram showing configuration of an image processing device according to a fourth embodiment;

FIG. 13A is a diagram showing an example of a left side facial image, and FIG. 13B is a diagram showing an example of a right side facial image;

FIG. 16 is a diagram showing a state in which a facial image is synthesized to a template image according to the fourth embodiment.

DETAILED DESCRIPTION OF THE PREFERRED EMBODIMENTS

First Embodiment

Figure 1:
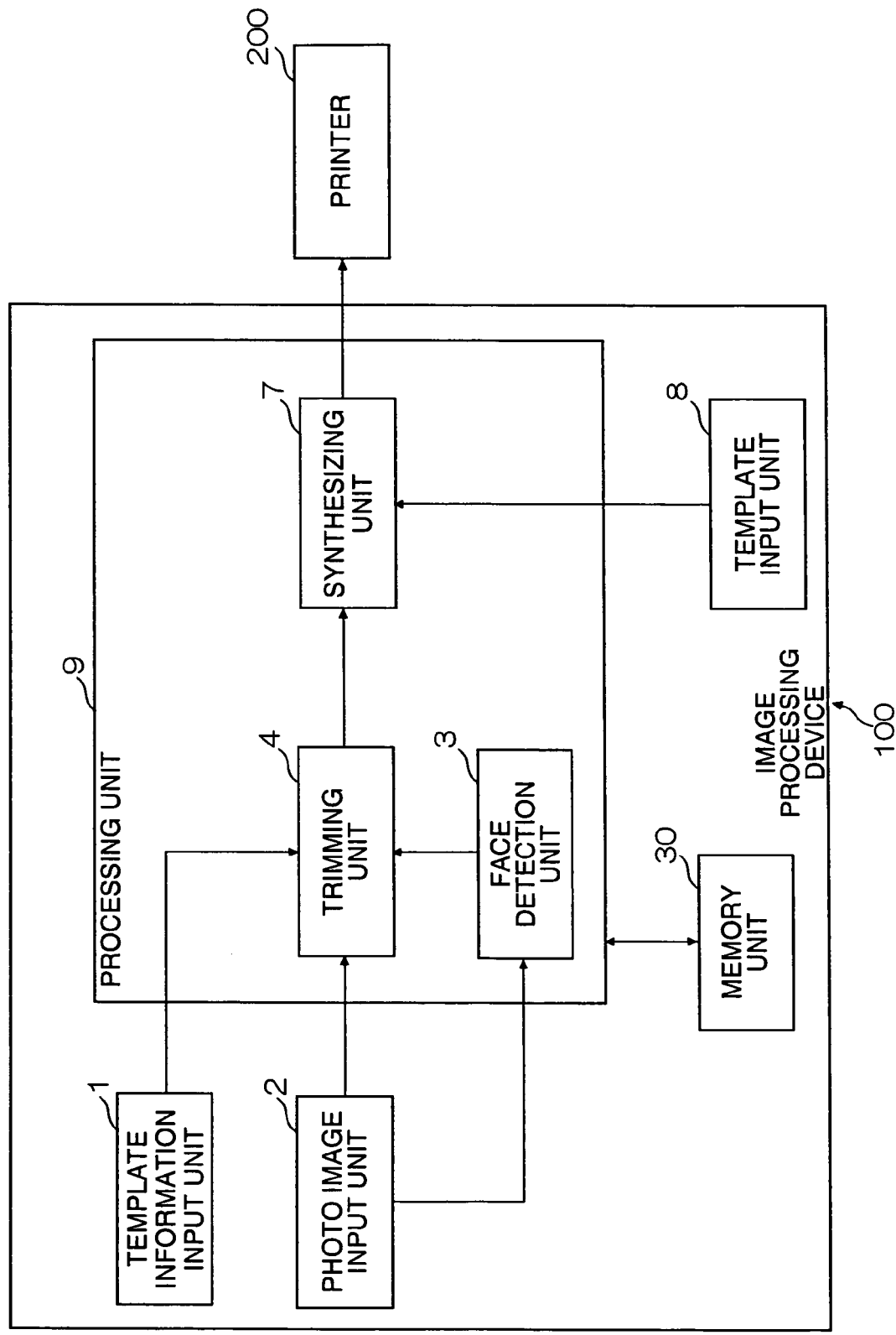
FIG. 1 is a schematic functional configuration drawing of an image processing device according to a first embodiment.

FIG. 1 is a schematic functional configuration of an image processing device 100 according to the first preferred embodiment of the present invention. The processing device 100 comprises a template information input unit 1, a photo image input unit 2, a face detection unit 3, a trimming unit 4, a synthesizing unit, 7, and a template input unit 8. The photo image input unit 2 inputs a photographed image acquired with a digital still camera, a film scanner, a media driver, various wireless or wired communication devices, or the like. The face detection unit 3, the trimming unit 4, and the synthesizing unit 7 are included in a processing unit 9 which is composed of various operation devices, such as an ASIC (Application Specific Integrated Circuit), an one-chip microcomputer, a personal computer, or the like.

The face detection unit 3 detects a facial image which is a facial portion of a character, from the photographed image. When a plurality of characters are recorded in the photographed image, a plurality of facial images are detected individually. The trimming unit 4 extracts each of the facial images detected individually, as an independent image from the photographed image. The synthesizing unit 7 synthesizes the facial image and template image in order to generate a synthesis image. Incidentally, the details will be described later. The processing device 100 may be connected to a printer 200 which prints the synthesis image. In addition, although not shown, the processing device 100 may also include: an operation unit which is composed of a keyboard or touch panel for receiving input operations from the user; a media writer which stores the synthesized image in a memory unit 30 or other various storage mediums; and other components.

Next, a sequence of synthesizing process which is executed by the image processing device 100 will be described with reference to the flowchart in FIG. 2.

Figure 2:
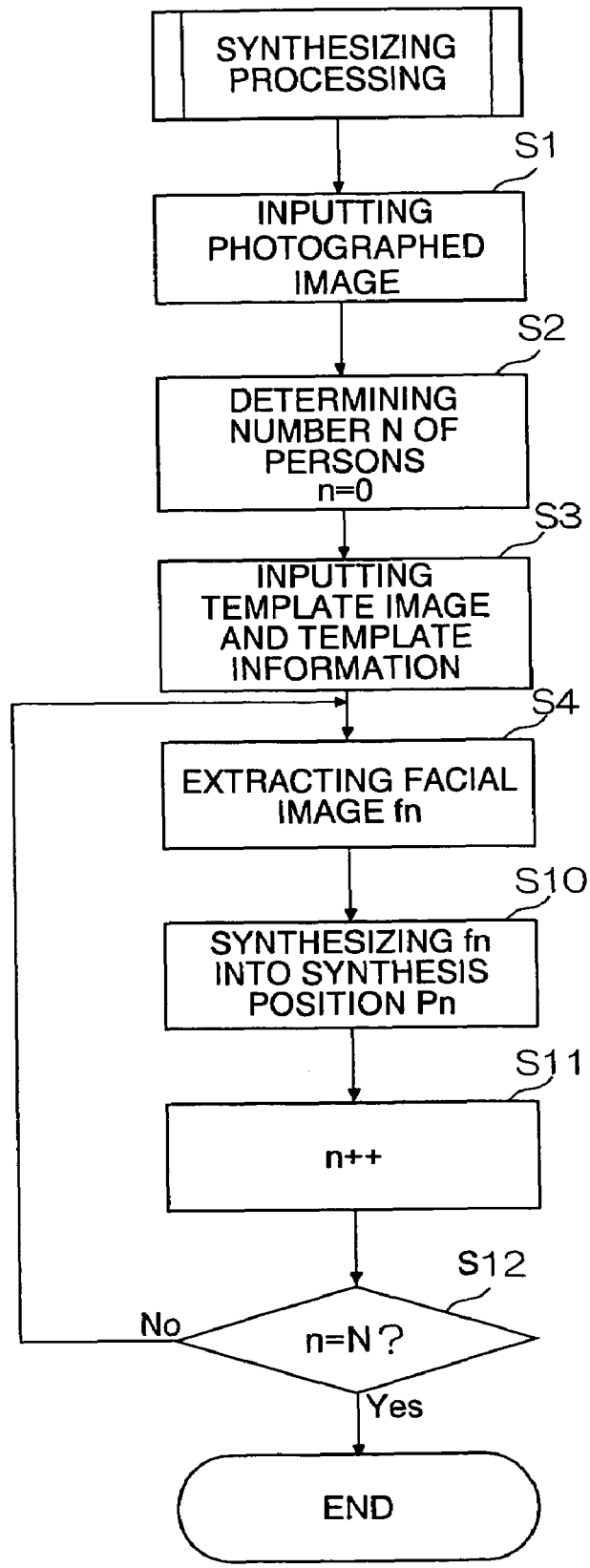
FIG. 2 is a flowchart showing a sequence of synthesizing process according to the first embodiment.
Figure 3:
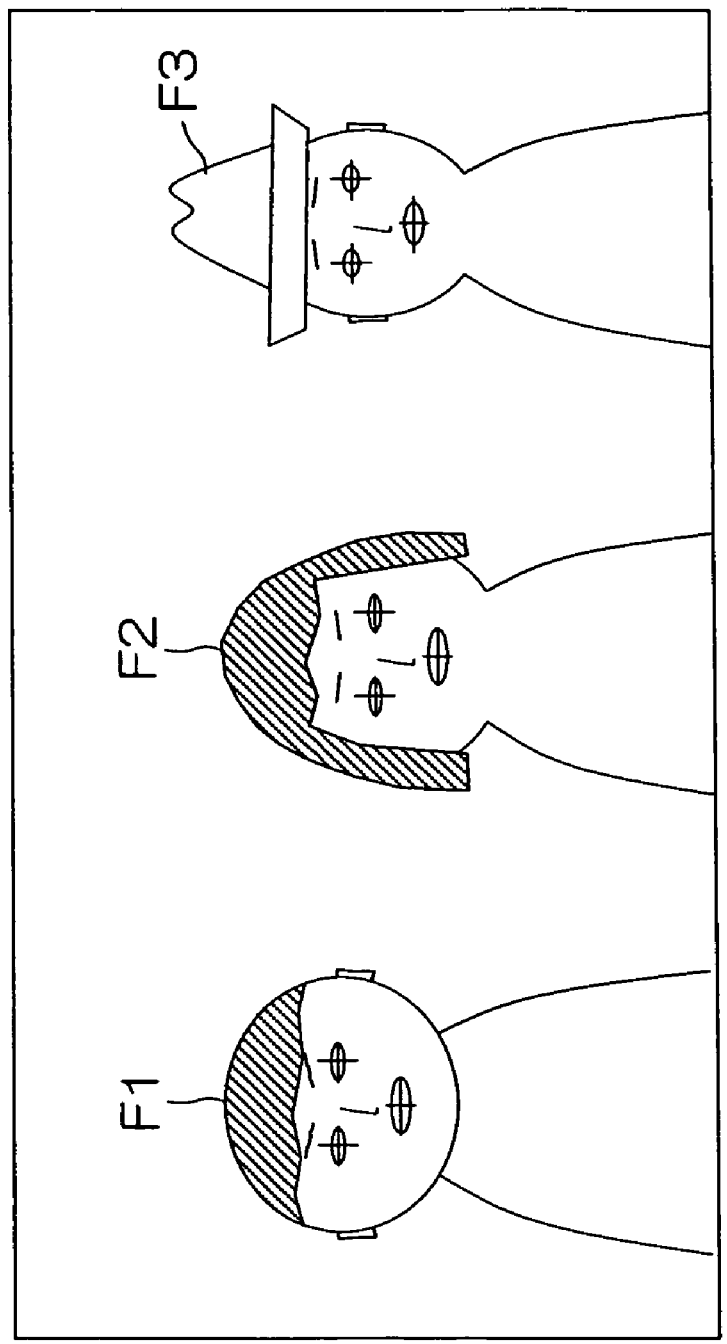
FIG. 3 is a plan view diagram showing an appearance of a photographed image.

As shown in FIG. 2, the photo image input unit 2 inputs the photographed image at step S1. FIG. 3 shows an example of the photographed image inputted by the photo image input unit 2. The photographed image includes one or a plurality of characters.

At step S2 in FIG. 2, in the face detection unit 3, the number N of characters recorded in the photographed image are determined by detecting faces from the photographed image. The number N of characters may be decided according to the number of faces that can be recognized using a well-known technique for recognizing faces. The photographed image shown in FIG. 3 is N=3. Next, the numerical value n which counts the number of times step S12 described later is repeated is set to n=0.

Figure 4:
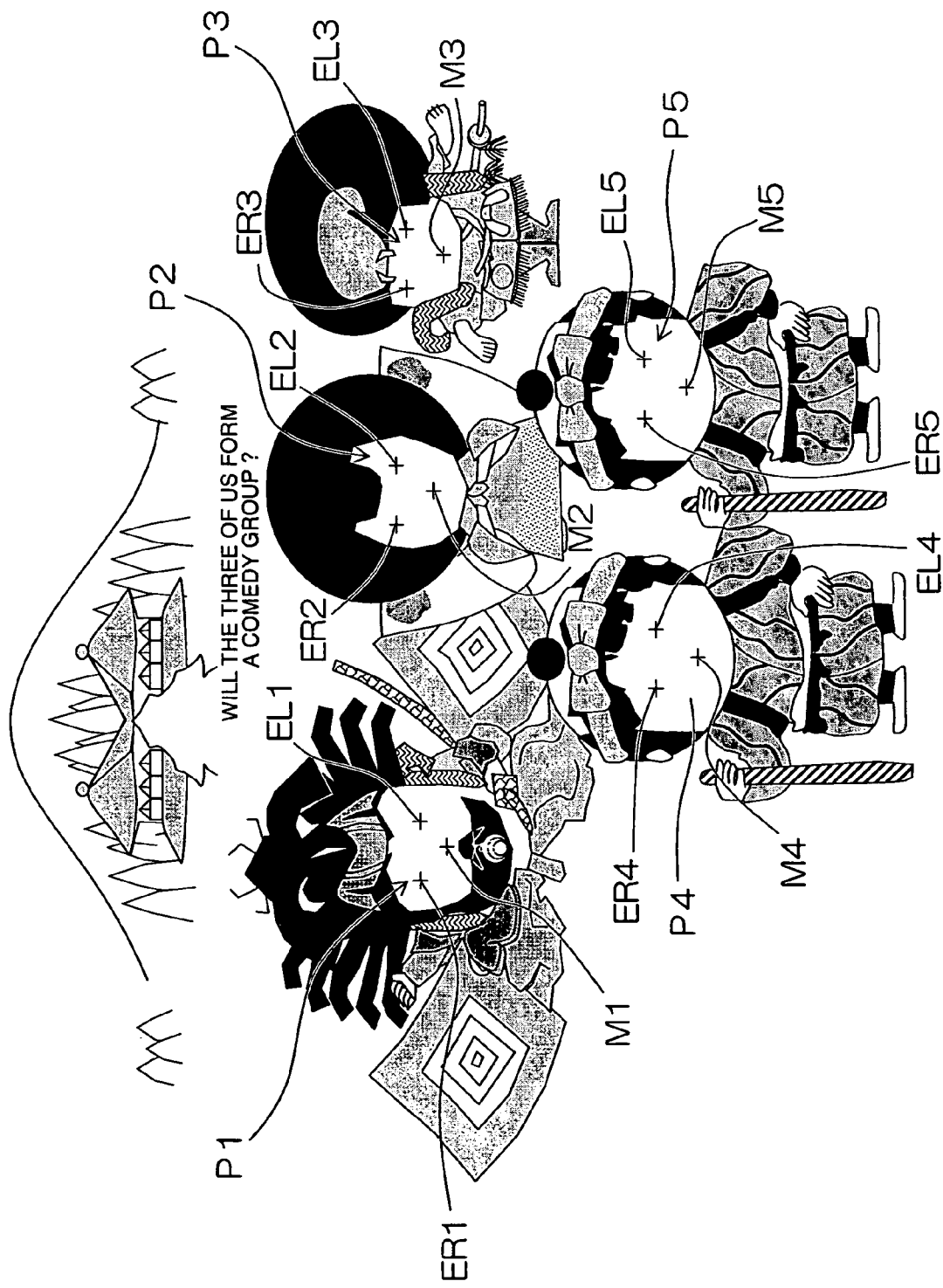
FIG. 4 is a diagram showing an appearance of a template image.

At step S3 in FIG. 2, the template input unit 8 inputs a template image. FIG. 4 shows an example of the template image. As shown in FIG. 4, the template image has a synthetic area Pn which is a blank area for synthesizing an image fn (hereinafter referred to as a facial image) of a facial portion extracted from a character Fn (n=1, 2 . . . ) of the photographed image. As described later, the facial image fn to be synthesized with each of the synthetic areas Pn is extracted from the photographed image. On the other hand, the template information input unit 1 inputs template information Tn in a blank synthetic area Pn as though the facial portion of the human character on the template image has been carved out. The template information Tn includes a right eye position ERn and a left eye position ELn. The right eye position ERn is information which prescribes a position for disposing the right eye, and the left eye position ELn is information which prescribes a position for disposing the left of the facial image fn. Incidentally, the extraction of the facial image fn from the character Fn in the photographed image may also be arbitrarily determined according to the user's operation.

FIG. 4 conceptually shows the right eye position ERn and the left eye position ELn in the template information Tn corresponding to the synthetic area Pn, but the template information Tn, right eye position ERn, and left eye position ELn are invisible information on the template image, in reality.

Figure 5:
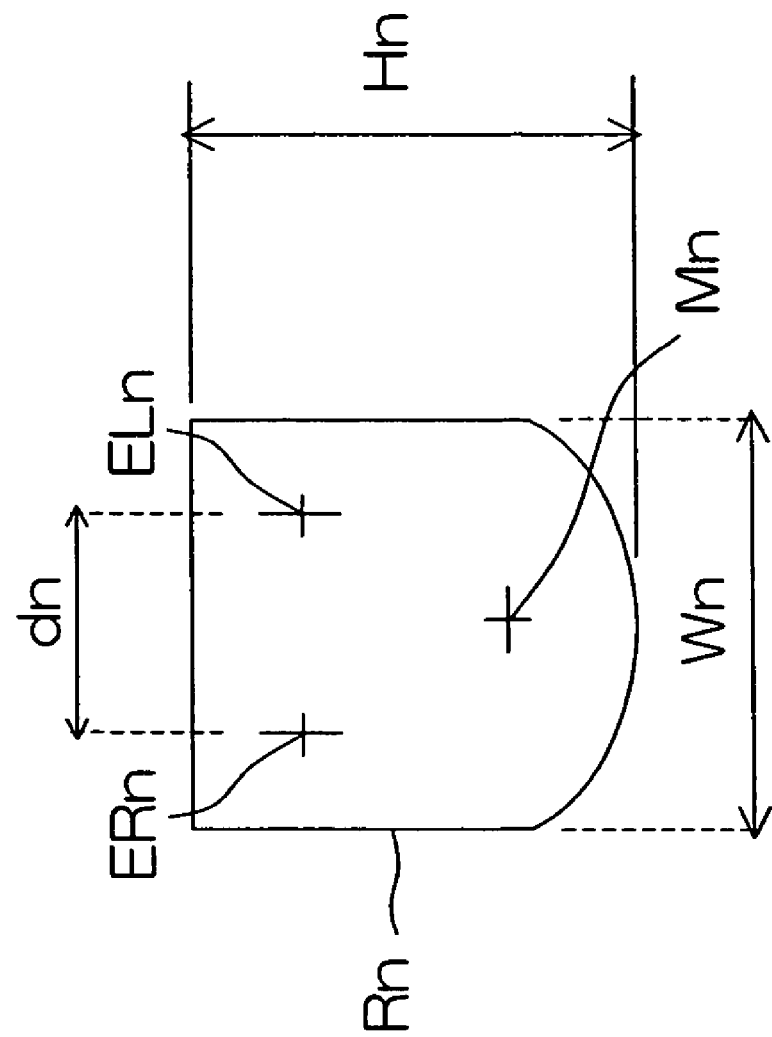
FIG. 5 is an illustrative diagram showing a concept of template information.

FIG. 5 shows the detailed visualization of the template information Tn. The template information Tn includes a periphery Rn which encompasses the right eye position ERn and the left eye position ELn in the synthetic area Pn. In addition, the template information Tn may include a mouth position Mn and positions of various facial components such as a nose position. The distance from the right eye position ERn to the left eye position ELn in the synthetic area Pn is described as dn.

At step S4 in FIG. 2, the face detection unit 3 detects the right eye position and the left eye position in the character Fn from the photographed image. The face detection unit 3 may also detect the mouth position in the character Fn from the photographed image. The distance from the right eye position to the left eye position which are detected in the character Fn is described as dn'.

Figure 6:
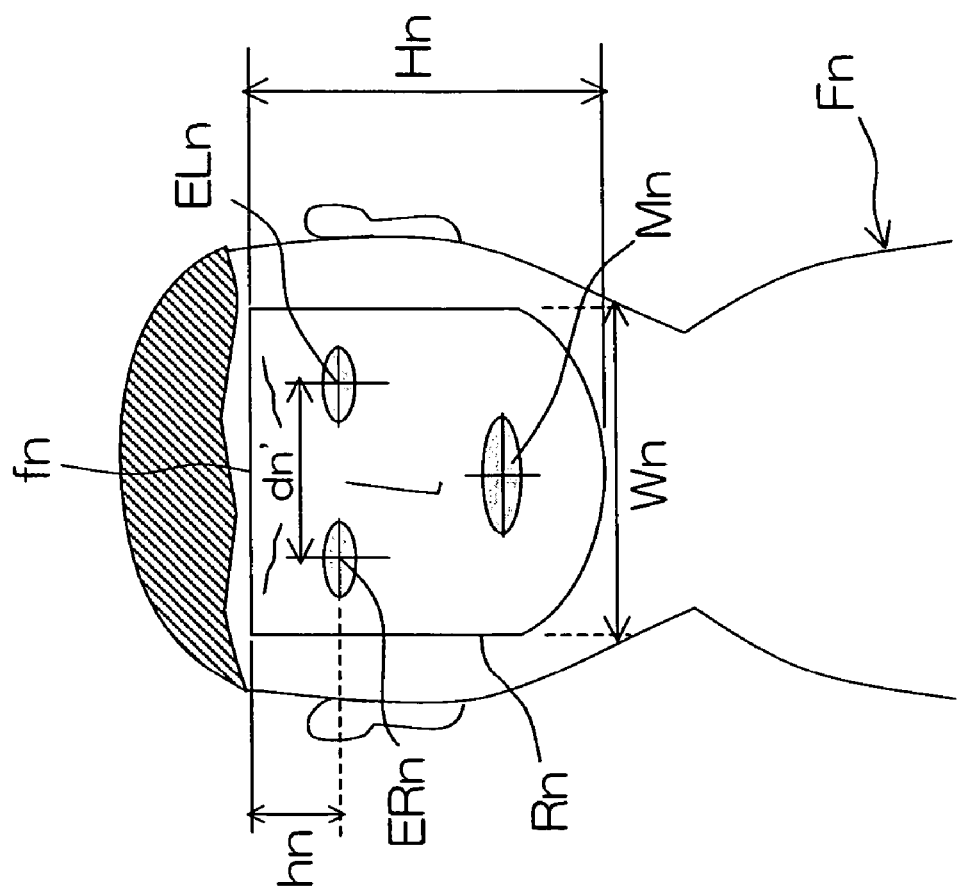
FIG. 6 is a diagram showing an appearance of a facial image.

As shown in FIG. 6, the trimming unit 4 adjusts the length and breadth of the image of the character Fn according to a reduction ratio dn/dn'. When the right eye position ERn of the template information Tn is disposed on the position of the right eye of the adjusted character Fn and the left eye position ELn of the template information Tn is disposed on the position of the left eye of the adjusted character Fn, then the trimming unit 4 extracts the image of the character Fn encompassed by the periphery Rn in the synthetic area Pn, as the facial image fn.

Therefore, the facial image fn can be extracted so that both eyes in the character Fn do not stick out from the synthetic area Pn. When the mouth position in the character Fn is detected while the template information Tn includes the mouth position Mn, the facial image fn may be extracted so that the position Mn of the mouth of the template information Tn is further disposed on the detected mouth position.

At step S10 in FIG. 2, the synthesizing unit 7 disposes the right eye of the facial image fn onto the right eye position ERn and disposes the left eye of the facial image fn onto the left eye position ELn according to the template information Tn, thereby synthesizing the facial image fn with the template image. When the template information Tn includes the mouth position Mn, the mouth of the facial image fn is disposed onto the mouth position Mn of the template information Tn so as to synthesize the facial image fn and into template image.

Figure 7:
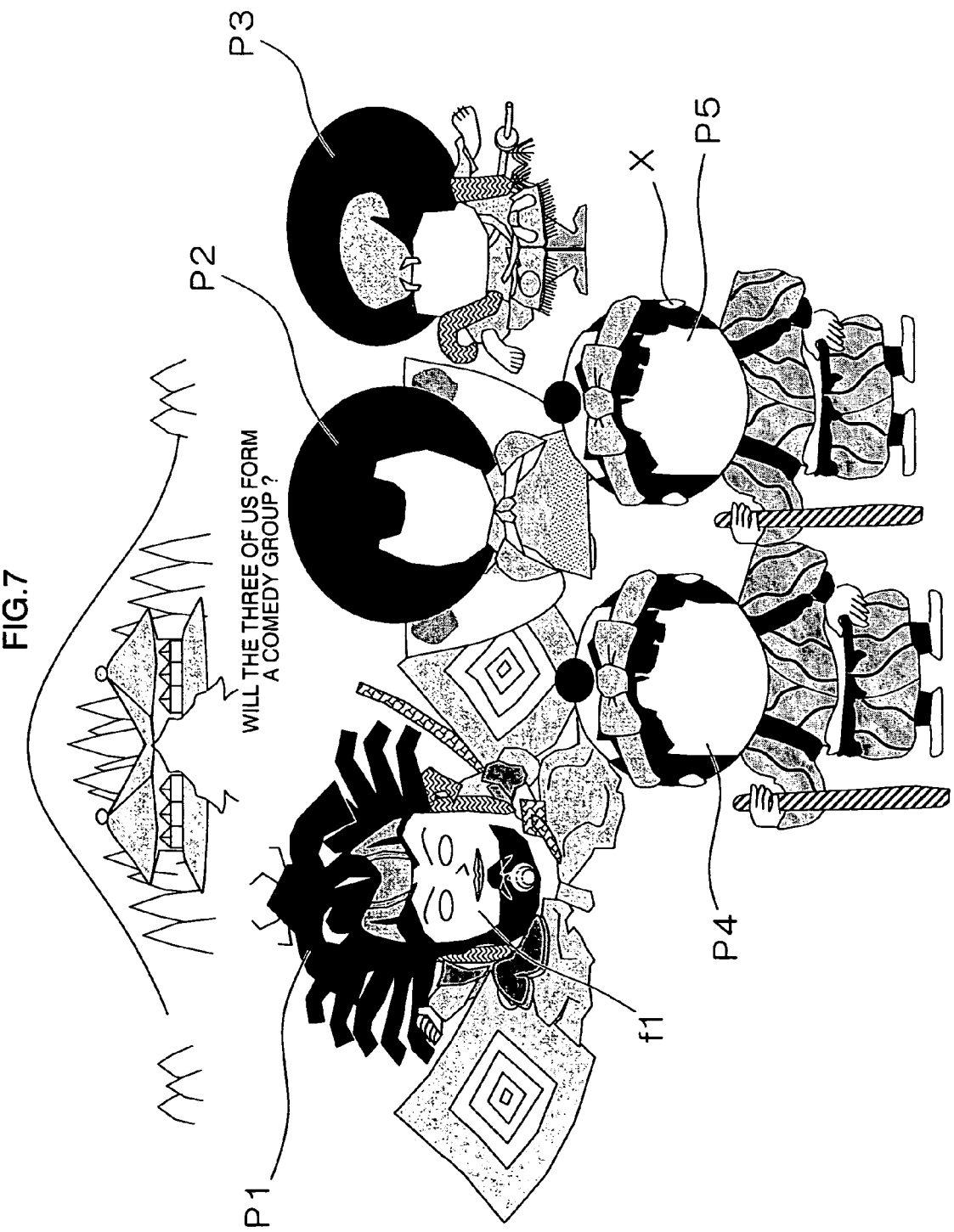
FIG. 7 is a diagram showing a state in which a facial image is synthesized with a template image.

FIG. 7 shows a state in which a facial image is synthesized with a template image. As shown in FIG. 7, the facial image fn is disposed onto the synthetic area Pn, according to the right eye point, the left eye position, and mouth position in the character Fn. Therefore, the accuracy of disposition can be improved in comparison to a case of disposing the facial image fn according to the two points of right eye ERn and left eye ELn.

At step S11 in FIG. 2, the n is incremented, and then it is determined whether or not to be n=N at step S12. When it is not n=N, the routine returns to step S4. On the other hand, when it is n=N, the processing is completed.

Incidentally, the image processing program which makes the processing unit 9 execute the steps S1 to 12 is stored in the memory unit 30 constituted by a semiconductor memory or other storage mediums. In addition, the image processing program may be recorded on a CD-ROM, DVD, MO or other computer readable recording mediums so as to be loaded into the processing unit 9, or may be distributed to the processing unit 9 via the Internet or other networks.

As described above, the two points of right eye and left eye, or three points upon adding the mouth thereto in the character Fn are disposed onto the positions of right eye ERn, left eye ELn, and mouth Mn which are prescribed by the template information Tn of the synthetic area Pn so that the facial image fn is extracted, and then the facial image fn are synthesized with the template image by disposing the right eye and left eye or the mouth of the extracted facial image fn onto the right eye position ERn, left eye position ELn or position Mn of the mouth prescribed by the template information Tn.

Therefore, it is possible to prevent both eyes or the mouth of the facial image fn from becoming synthesized in a state of sticking out from the synthetic area Pn.

Second Embodiment

Figure 8:
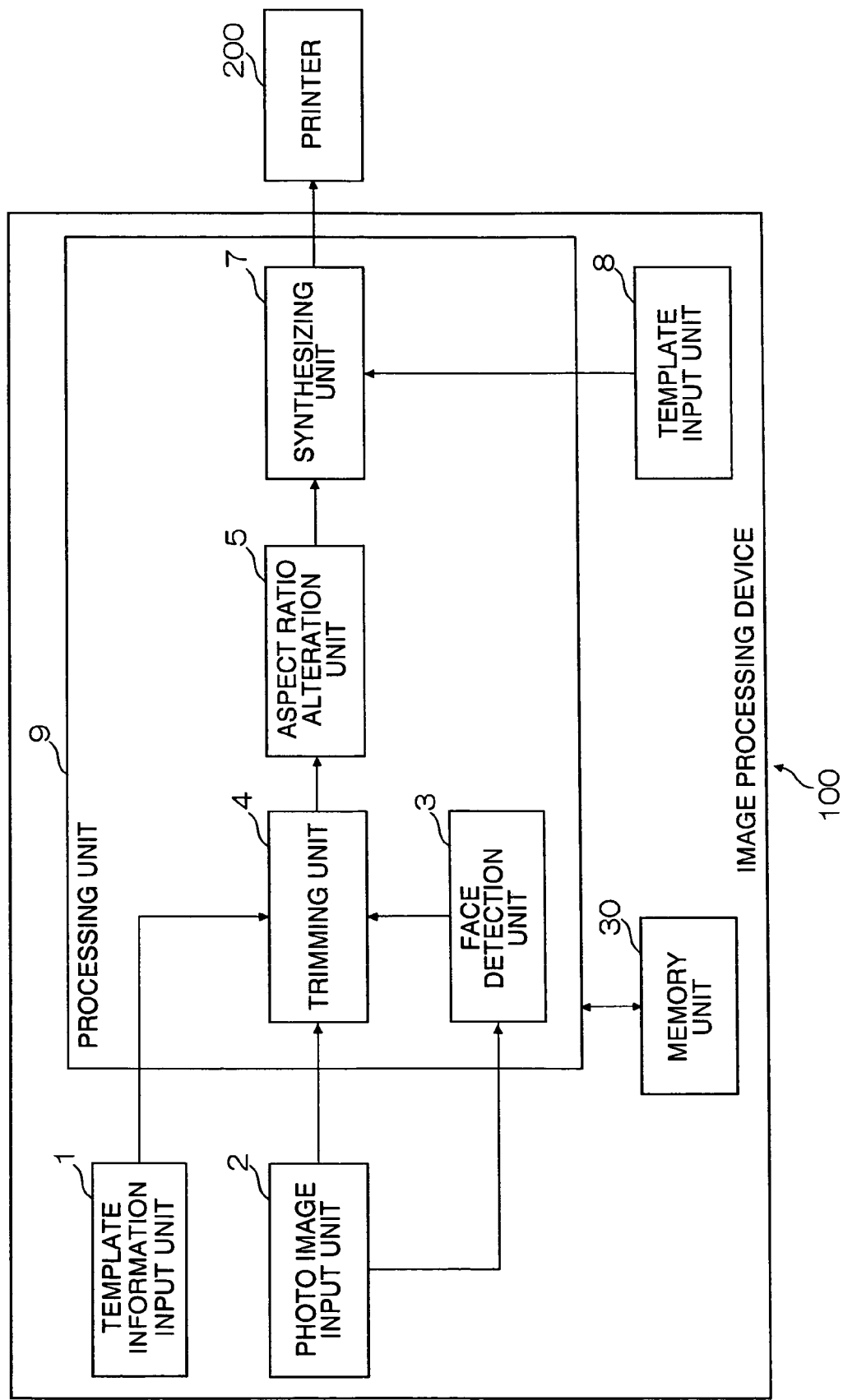
FIG. 8 is a schematic block diagram showing configuration of an image processing device according to a second embodiment.

FIG. 8 is a schematic block diagram showing configuration of an image processing device 100 according to the second embodiment of the present invention. According to the present invention, the processing unit 9 in this image processing device 100 further comprises an aspect ratio alteration unit 5, in comparison with the first embodiment. The aspect ratio alteration unit 5 is a device which performs a process for altering the aspect ratio (Hn:Wn, which is the length and breadth of the facial image fn; see FIG. 6) of the facial image fn. Furthermore, the template information input unit 1 inputs an aspect ratio An (for example, 1:1.1) of a facial image fn to which is to be synthesized into a synthetic area Pn, as a part of the template information Tn. The function of the other components is the same as the first embodiment, and the description thereof is omitted here.

Figure 9:
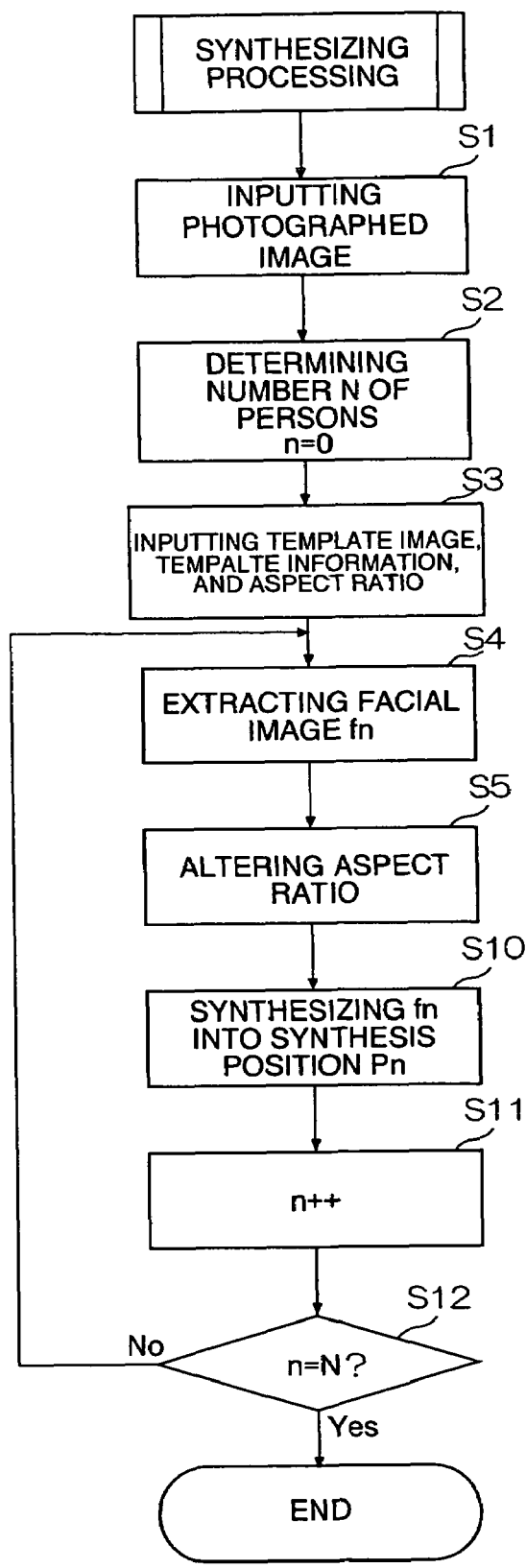
FIG. 9 is a flowchart showing a sequence of synthesizing process according to the second embodiment.

FIG. 9 is a flowchart showing a sequence of synthesizing process executed by the image processing device 100 according to the second embodiment. In this synthesizing process, the template information input unit 1 inputs the aspect ratio An of the facial image fn which is to be synthesized to the synthetic area Pn, as a part of the template information, at step S3. Furthermore, the aspect ratio alteration unit 5 alters the aspect ratio of the facial image fin according to the aspect ratio An at step S5. At step S10, the synthesizing unit 7 synthesizes the facial image fn with the altered aspect ratio to the template image. The other process steps are the same as the first embodiment, and the description thereof is omitted here. In the image processing device 100 according to the second embodiment, since the aspect ratio An is set arbitrarily, the aspect ratio of the facial image fn can be altered to coincide with the various shapes (round face shape and so on) of the synthetic area Pn.

Third Embodiment

Figure 10:
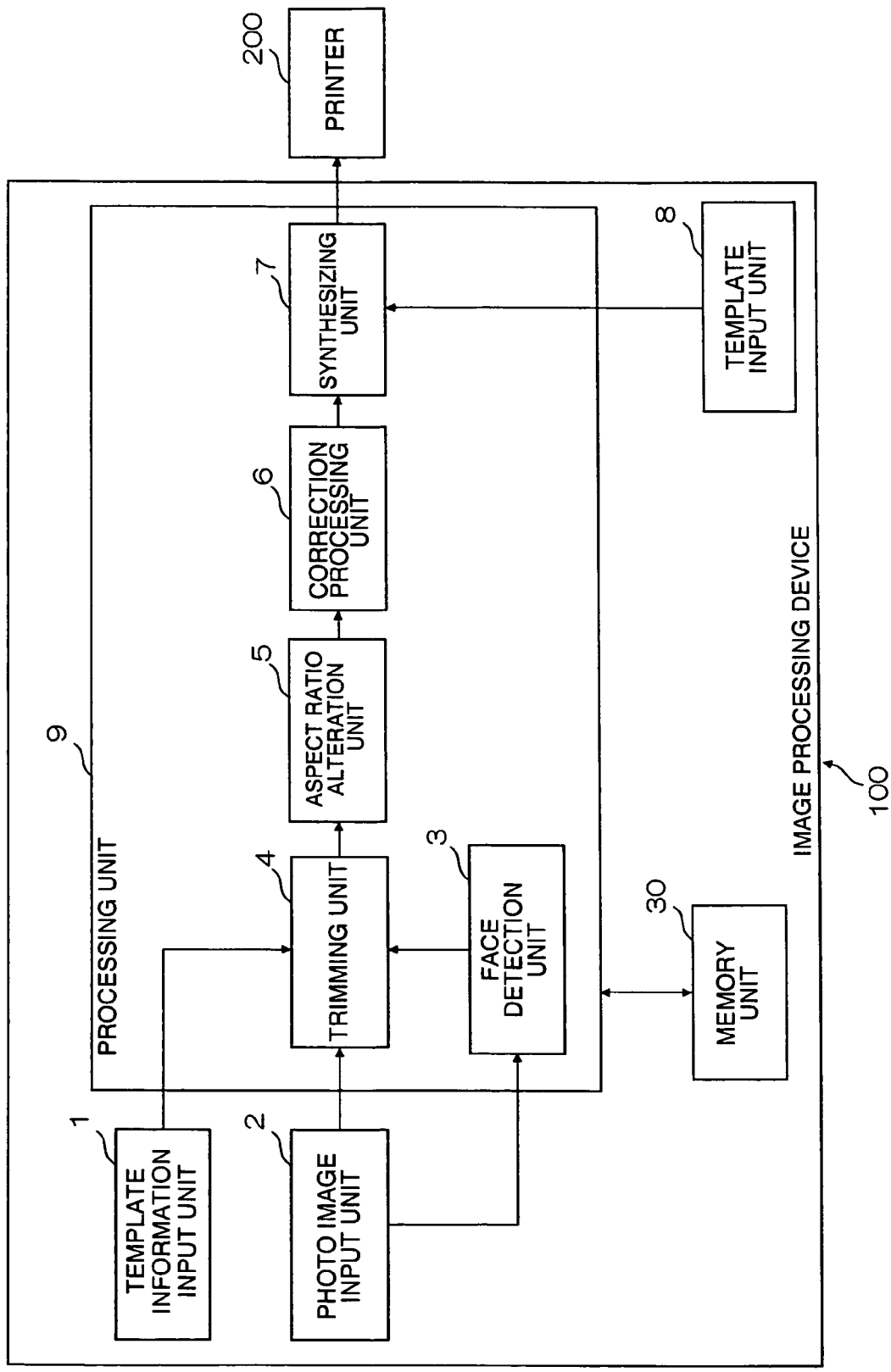
FIG. 10 is a schematic block diagram showing configuration of an image processing device according to a third embodiment.

FIG. 10 is a schematic block diagram showing configuration of an image processing device 100 according to a third embodiment of the present invention. According to the third embodiment, the processing unit 9 in this image processing device 100 further comprises a correction processing unit 6, in comparison with the second embodiment. Furthermore, the template information input unit 1 inputs correction reference information which become a reference for correcting a feature quantity of the facial image (such as the density, brightness, color, contrast, sharpness, and saturation relating to the facial image fn), as a part of the template information Tn. For example, the correction reference information is information such as the density, brightness, color, contrast, sharpness, and saturation, which represents the feature quantity of an image to be disposed onto the periphery of the synthetic area Pn, such as an ear portion X in a "backdrop" character (see FIG. 4).

Figure 11:
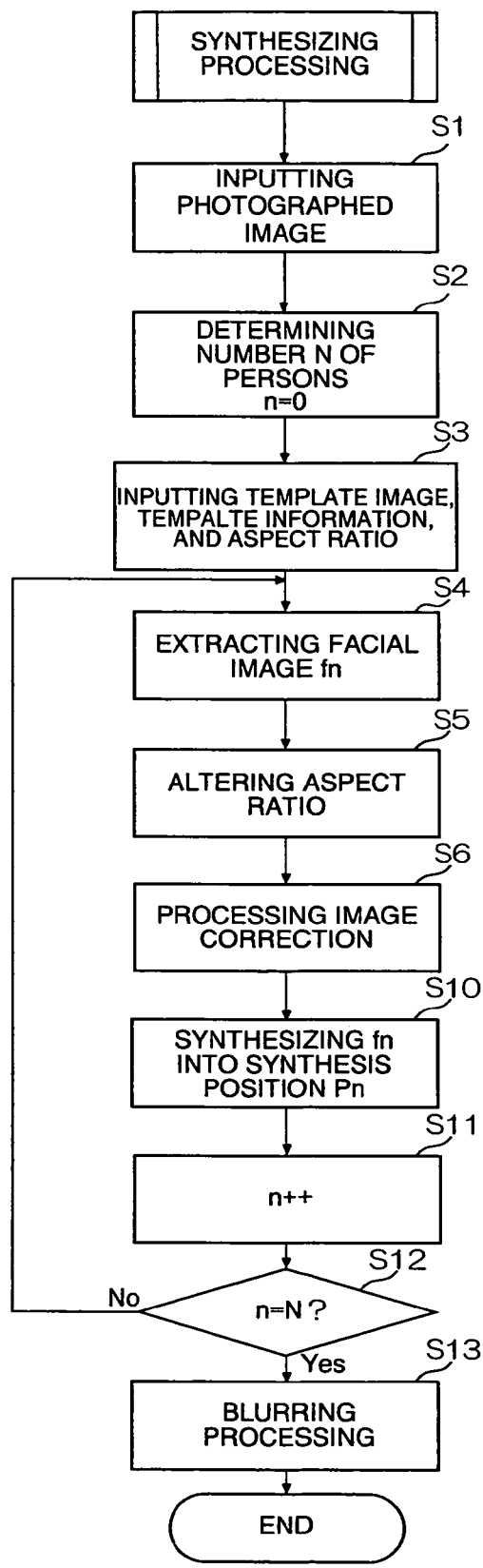
FIG. 11 is a flowchart showing a sequence of synthesizing process according to the third embodiment.

FIG. 11 is a flowchart showing a sequence of synthesizing process executed by the image processing device 100 according to the third embodiment. At step S6 in this synthesizing process, the correction processing unit 6 acquires the facial image feature information which shows the feature quantity such as the density, brightness, color, contrast, sharpness and saturation, from the facial image fn. At the same time, the correction processing unit 6 acquires the correction reference information (such as the density (brightness), color, contrast, sharpness, and saturation which include the template information), from the template information input unit 1. Next, the correction processing unit 6 determines the amount of correction of the feature quantity of the facial image (such as the density, brightness, color, contrast, sharpness, and saturation), by comparing the facial image feature information and the correction reference information. Then, the correction processing unit 6 performs a prescribed image correction process such as color conversion, density conversion, tone correction and the like to the facial image fn according to this determined amount of correction.

Therefore, since various corrections of brightness or color according to the feature quantity of the peripheral image can be performed to the facial image fn, it is possible to reduce an odd feeling caused from the difference in appearance of the synthesized facial image fn and the template image.

Incidentally, the correction processing unit 6 may also perform the prescribed image process to the facial image fn according to the amount of correction which is set by the user's operation. Furthermore, the image processing device 100 may not execute the step S5, and may not comprise an aspect ratio alteration unit 5.

Moreover, the correction processing unit 6 performs a blurring process (smoothing process) to the peripheral pixels of blank portion of the synthetic area Pn after synthesizing the facial image with template image (step S13). Therefore, since the facial image of the actual photographic subject and the template image, such as a CG image, can be synthesized smoothly, it is possible to reduce the odd feeling.

Fourth Embodiment

As described above, in the first to third embodiments, it is assumed that the facial image is photographed with the facial image facing frontward (referred to as the front facial image). Nevertheless, a facial image photographed from the side (referred to as the side facial image) may also be synthesized with the template image.

FIG. 12 is a schematic block diagram showing configuration of an image processing device 100 according to a fourth embodiment. According to the fourth embodiment, the processing unit 9 in this image processing device 100 further comprises a facing direction determination unit 10, in comparison with the first to third embodiments.

The face detection unit 3 detects the front facial image by extracting the positions of features unique to the front facial image, such as the contour of the face facing frontward, right and left eyes, and nostrils. Furthermore, the face detection unit 3 also detects the side facial image by extracting the positions of features unique to the side facial image, such as the contour of the side face, left eye or right eye, jaw tip, tip of the nose. In addition, the left or right eyebrow or the vertex of the head may also be detected.

Alternatively, it is also preferable that the face detection unit 3 comprises: a front face detector for detecting the front facial image; a right side face detector for detecting the right side facial image; and a left side face detector for detecting the left side facial image. In this case, the facing direction determination unit 10 determines the front facial image when the front facial image is detected by the front face detector, determines the right side facial image when the right side facial image is detected by the right side face detector, and determines the left side facial image when the left side facial image is detected by the left side face detector. If the detections of the same facial image by those face detectors overlap, the facing direction determination unit 10 determines the direction of facial image according to a reliability of facial detection by each face detector, for example.

FIGS. 13A and 13B are diagrams illustrating the unique features of the side facial image. FIG. 13A shows the features of a side facial image when the left side is facing frontward, and FIG. 13B shows the features of a side facial image when the right side is facing frontward.

As shown in FIG. 13A, the face detection unit 3 detects the positions of the left eye X1, the nose apex X2, the jaw tip X3, and the facial contour Cl, according to the photographed image inputted by the photo image input unit 2.

On the other hand, as shown in FIG. 13B, the face detection unit 3 detects the positions of the right eye Y1, the nose apex Y2, the jaw tip Y3, and the facial contour Cr, according to the photographed image inputted by the photo image input unit 2.

The trimming unit 4 cuts out the image portion which is encompassed by the facial contours Cl and Cr. Those cut images are respectively referred to as a left side facial image Il and a right side facial image Ir.

The facing direction determination unit 10 determines whether the facial orientation is facing rightward or leftward when viewed from the front, according to the positions of features unique to the side facial image which is extracted by the face detection unit 3. More specifically, as shown in FIG. 13A, when the position of the nose apex X2 is on the left side of the position of the jaw tip X3, the facing direction determination unit 10 determines that the facial orientation faces leftward. On the other hand, as shown in FIG. 13B, when the position of the nose apex Y2 is on the right side of the position of the jaw tip Y3, the facing direction determination unit 10 determines that the facial orientation faces rightward.

Figure 14:
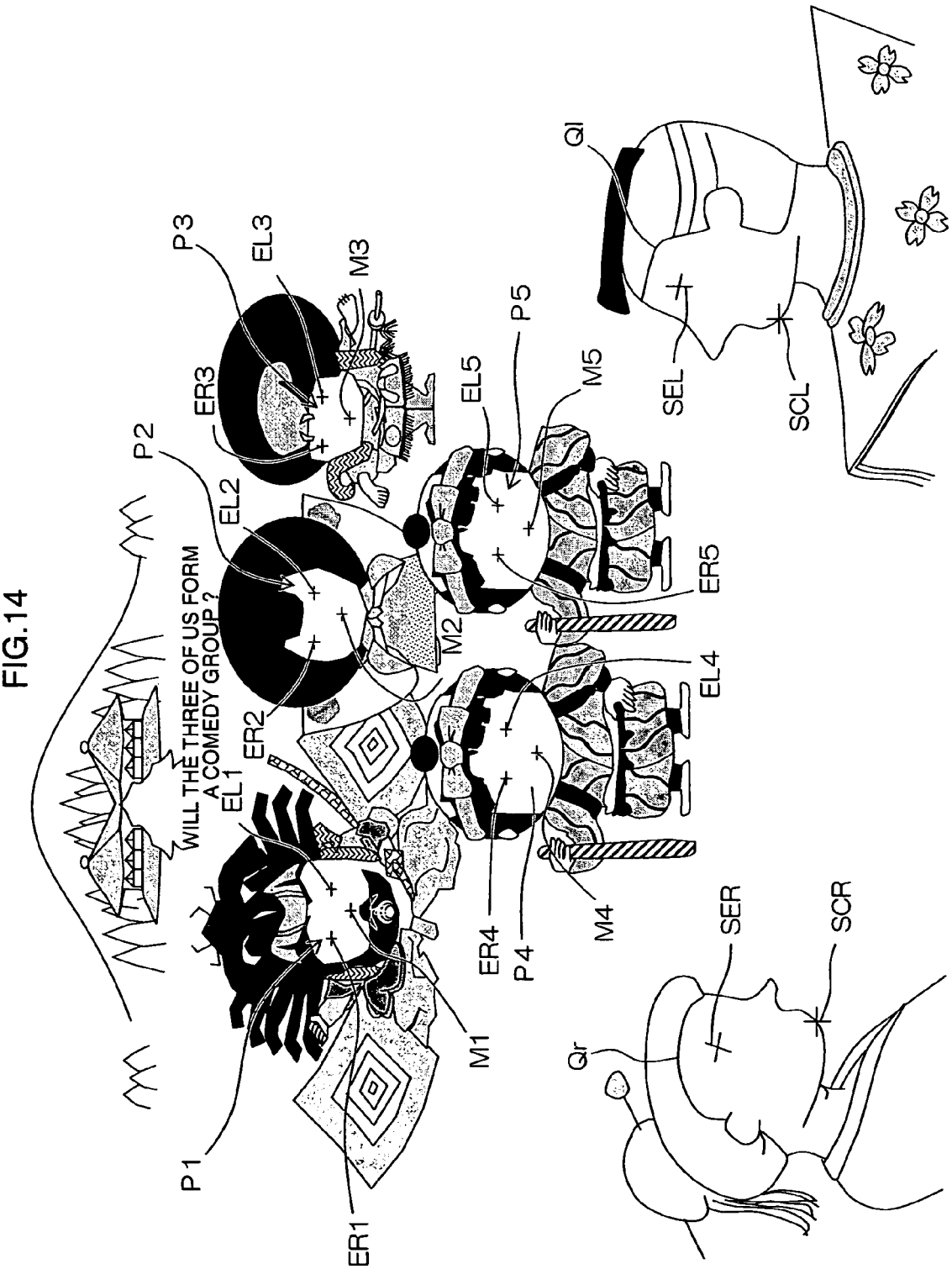
FIG. 14 is a diagram showing the appearance of a template image according to the fourth embodiment.

As shown in FIG. 14, the template image inputted by the template input unit 8 is provided with a synthetic area Ql for the side facial image facing leftward, and a synthetic area Qr for the side facial image facing rightward. Incidentally, only two synthetic areas for the side facial images are shown in FIG. 14, but may be increased or decreased as necessary.

The template information Tn inputted by the template information input unit 1 includes a left eye position SEL which is information for prescribing the position of disposing the left eye, and a jaw tip position SCL which is information for prescribing the position of disposing the jaw tip onto the synthetic area Ql for the side facial image facing leftward. FIG. 14 illustrates a specific disposition of the left eye position SEL and jaw tip position SCL in the synthetic area Ql.

Furthermore, the template information inputted by the template information input unit 1 includes a right eye position SER which is information for prescribing the position of disposing the right eye, and a jaw tip position SCR which is information for prescribing the position of disposing the jaw tip in the synthetic area Qr for the side facial image facing rightward. FIG. 14 illustrates the specific disposition of the right eye position SER and jaw tip position SCR in the synthetic area Qr.

Figure 15:
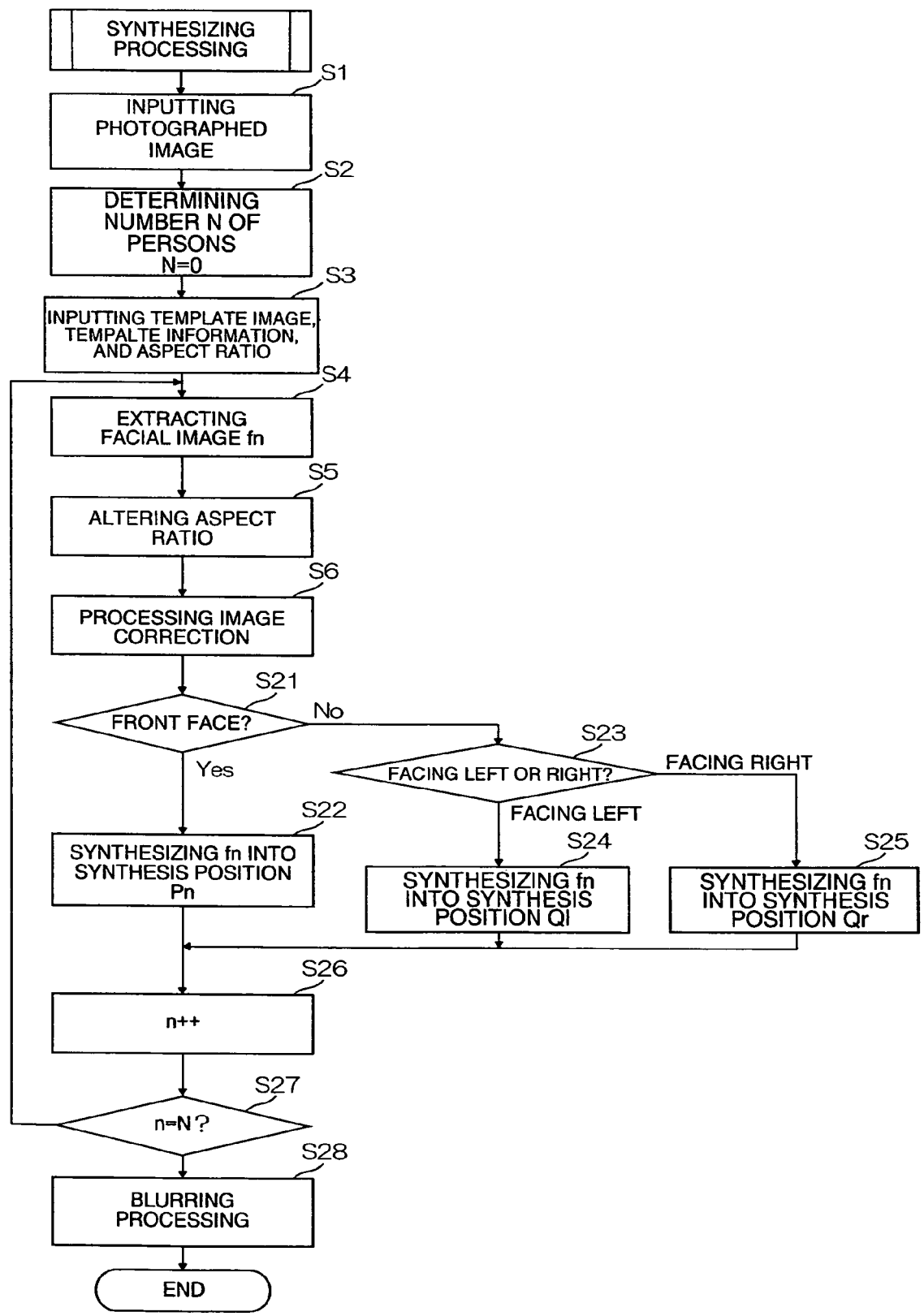
FIG. 15 is a flowchart showing a sequence of synthesizing process according to the fourth embodiment.

FIG. 15 is a flowchart showing a sequence of synthesizing process executed by the image processing device 100 according to the fourth embodiment. In this synthesizing process, the side facial image facing leftward is synthesized with the synthetic area Ql for the side facial image facing leftward, while the side facial image facing rightward is synthesized with the synthetic area Qr for the side facial image facing rightward. Incidentally, the steps S1 to S6 are the same as the first to third embodiments described above, and then the description thereof is omitted here. Steps following step S21 are described hereinafter.

At the step S21, the facing direction determination unit 10 determines whether the extracted facial image fn of the face detection unit 3 is a front facial image or a side facial image. When it is determined that the facial image fn is a front facial image, the routine proceeds to step S22. On the other hand, when it is determined that the facial image fn is a side facial image, the routine proceeds to S23.

At the step S22, as similar to step S10 in the first to third embodiments described above, the facial image fn is synthesized with the synthetic area Pn.

At the step S23, the facing direction determination unit 10 determines whether the facial orientation is facing leftward or facing rightward when viewed from the front, according to the positions of features unique to the side facial image which is extracted by the face detection unit 3. When it is determined that the facial orientation is facing leftward, the routine proceeds to step S24. On the other hand, when it is determined that the facial orientation is facing rightward, the routine proceeds to step S25.

At the step S24, the synthesizing unit 7 synthesizes the facial image fn into the synthetic area Ql. More specifically, according to the template information Tn, the synthesizing unit 7 disposes the left eye X1 in the facial image fn onto the left eye position SEL, and further disposes the jaw tip X3 in the facial image fn onto the jaw tip position SCL, thereby synthesizing the facial image fn with the template image.

At the step S25, the facial image fn is synthesized to the synthetic area Qr. More specifically, according to the template information Tn, the synthesizing unit 7 disposes the right eye Y1 in the facial image fn onto the right eye position SER, and further disposes the jaw tip Y3 in the facial image fn onto the jaw tip position SCR, thereby synthesizing the facial image fn with the template image.

Incidentally, steps S26 to S28 are the same as the steps S11 to S13 described above, and the description thereof is omitted here.

FIG. 16 shows the front facial image and the side facial image which are synthesized by the foregoing synthesizing process. As shown in FIG. 16, the facial image facing frontward is synthesized into Pn, the facial image facing leftward is synthesized into Ql, and the facial image facing rightward is synthesized into Qr. As described above, since facial images can be synthesized with the backdrops in which the facial images are faced together, the appearance of synthesized image can be improved, and an odd feeling by synthesis can be reduced.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image processing device, comprising:
a photo image input unit which inputs a photographed image including a character;
an extraction unit which extracts a facial image which is an image of a facial portion in the photographed image;
a template image input unit which inputs a template image having a synthetic area, the synthetic area being a blank area on which the facial image is disposed;
a template information input unit which inputs template information prescribing a position for disposing a prescribed component of the facial image on the synthetic area;
a decision unit which decides facial configuration information according to an area including the extracted facial image, the facial configuration information being information related to a prescribed component of the facial image; and
a synthesizing unit which synthesizes the facial image with the template image by disposing the facial image onto the synthetic area according to the facial configuration information and the template information.

2. The image processing device as defined in claim 1, wherein
the decision unit detects the facial portion in the photographed image;
the decision unit decides an approximate center position in the facial portion according to the detected facial portion;
the decision unit estimates relative position information of the prescribed component of the facial image with respect to the approximate center position; and
the decision unit decides the estimated relative position information as the facial configuration information.

3. The image processing device as defined in claim 1, wherein the prescribed component of the facial image includes at least a right eye and a left eye.

4. The image processing device as defined in claim 3, wherein the prescribed component of the facial image further includes at least one of a nose and a mouth.

5. The image processing device as defined in claim 1, wherein:
the decision unit detects position information of at least a left eye and a right eye from the facial image;
the decision unit decides the position information as the facial configuration information, the position information being information of the right eye and the left eye which are detected by the decision unit; and
the template information includes information which prescribes a position for disposing each of the right eye and the left eye.

6. The image processing device as defined in claim 1, wherein:
the template information includes aspect ratio alteration information for prescribing an aspect ratio of the facial image in the synthetic area; and
the image processing device further comprises an aspect ratio alteration unit which alters the aspect ratio of the extracted facial image according to the aspect ratio alteration information.

7. The image processing device as defined in claim 1, wherein:
the template information includes correction reference information which becomes a reference for correcting the facial image extracted by the extraction unit; and
the image processing device further comprises a correction unit which corrects the extracted facial image according to the correction reference information.

8. The image processing device as defined in claim 7, wherein the correction reference information includes a feature quantity of the template image to be disposed on the periphery of the synthetic area.

9. The image processing device as defined in claim 1, wherein:
the facial image includes at least one of a front facial image and a lateral facial image, the front facial image being an image of the facial portion which faces frontward, the lateral facial image being an image of the facial portion which faces sideways;
the template image includes at least one of a front face synthetic area and a lateral face synthetic area, the front face synthetic area being a synthetic area for disposing the front facial image, the lateral face synthetic area being a synthetic area for disposing the lateral facial image;

the template information prescribes at least one of a position for disposing the prescribed component of the front facial image on the front face synthetic area and a position for disposing the prescribed component of the lateral facial image on the lateral face synthetic area;

the image processing device further comprises a facing direction determination unit which determines whether the extracted facial image of the extraction unit is the front facial image or the lateral facial image; and the synthesizing unit synthesizes the facial image with the template image by respectively disposing at least one of the front facial image and the lateral facial image onto at least one of the front face synthetic area and the lateral face synthetic area according to the template information and a determination result by the facing direction determination unit.

10. The image processing device as defined in claim 9, wherein:

the facing direction determination unit determines whether the lateral facial image is a right facial image or a left facial image, the right facial image being an image of the facial portion facing rightward, the left facial image being an image of the facial portion facing leftward, the template image includes at least one of a right face synthetic area and a left face synthetic area, the right face synthetic area being a synthetic area for disposing the right facial image, the left face synthetic area being a synthetic area for disposing the left facial image;

the template information prescribes at least one of a position for disposing the prescribed component of the right facial image on the right face synthetic area and a position for disposing the prescribed component of the left facial image on the left face synthetic area; and the synthesizing unit synthesizes the facial image with the template image by respectively disposing at least one of the right facial image and the left facial image onto at least one of the right face synthetic area and the left face synthetic area according to the template information and a determination result by the facing direction determination unit.

11. The image processing device as defined in claim 9, wherein:

the decision unit detects the position information of a jaw tip and at least one of the right eye and the left eye according to the lateral facial image;

the decision unit decides the detected position information of at least one of the right eye and the left eye and the detected position information of the jaw tip as the facial configuration information; and the template information prescribes a position for respectively disposing at least one of the right eye and the left eye and the jaw tip of the lateral facial image on the lateral face synthetic area.

12. The image processing device as defined in claim 1, further comprising a blurring processing unit which performs blurring process to a peripheral edge portion of the blank area of the synthetic area after synthesizing the facial image with the template image by the synthesizing unit.

13. An image processing method, comprising the steps of:

inputting a photographed image including a character;

extracting a facial image which is an image of a facial portion of the photographed image;

inputting a template image having a synthetic area which is a blank area for disposing the facial image;

inputting template information which prescribes a position for disposing a prescribed component of the facial image on the synthetic area;

deciding facial configuration information from an area including the facial image extracted in the extraction step, the facial configuration information being information relating to a prescribed component of the facial image; and synthesizing the facial image with the template image by disposing the facial image onto the synthetic area according to the facial configuration information and the template information.

14. A computer readable medium having embodied thereon a computer program for processing by a computer, the computer program comprising:

a first code segment for inputting a photographed image including a character;

a second code segment for extracting a facial image which is an image of a facial portion of the photographed image;

a third code segment for inputting a template image having a synthetic area which is a blank area for disposing the facial image;

a fourth code segment for inputting template information which prescribes a position for disposing a prescribed component of the facial image onto the synthetic area;

a fifth code segment for deciding facial configuration information from an area including the extracted facial image, the facial configuration information being information relating to a prescribed component of the facial image; and a sixth code segment for synthesizing the facial image with the template image by disposing the facial image onto the synthetic area according to the facial configuration information and the template information.

15. The medium of claim 14, wherein the medium is a propagated signal.

16. The medium of claim 15, wherein the propagated signal is a carrier wave.

* * * * *